UNITED STATES PATENT OFFICE.

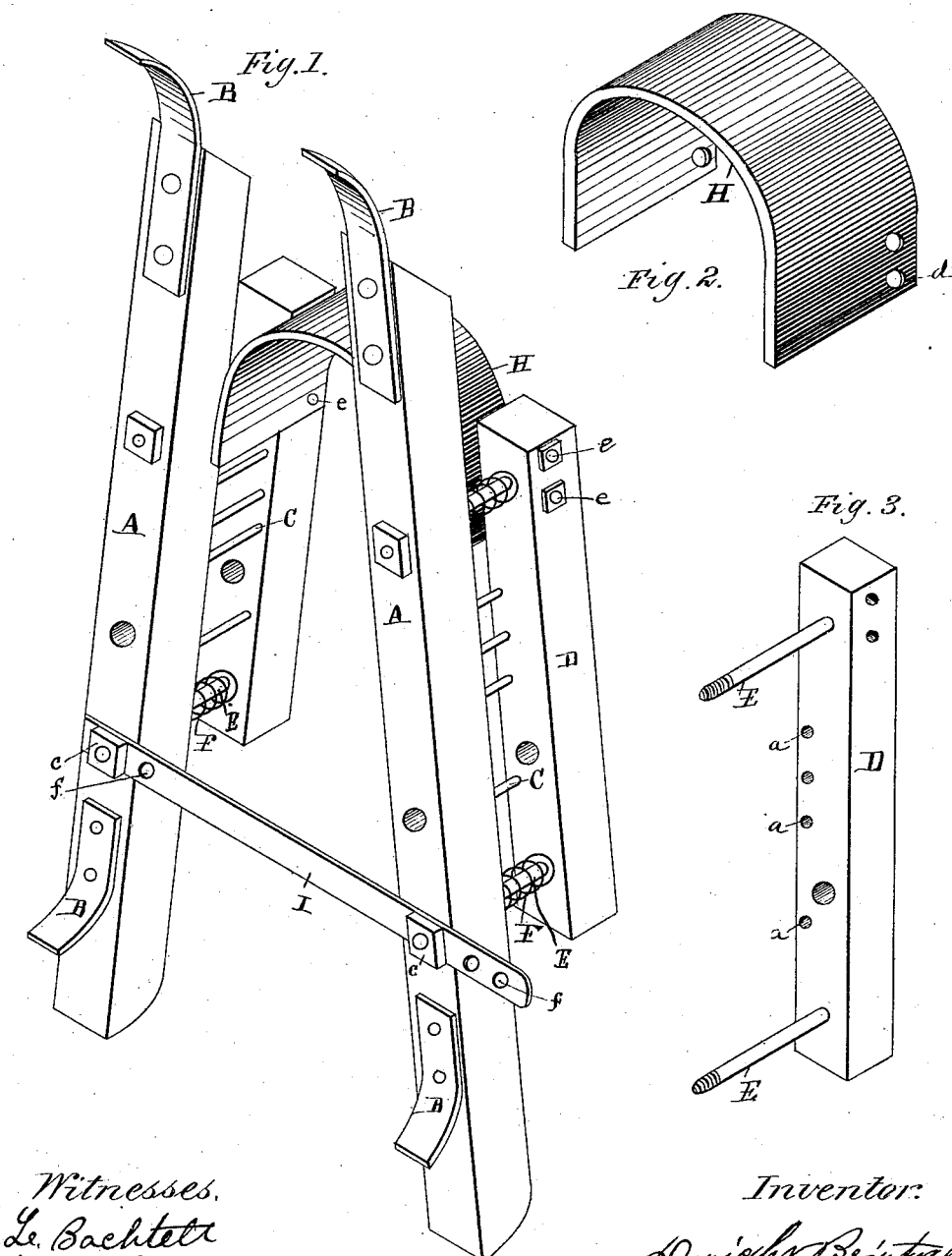

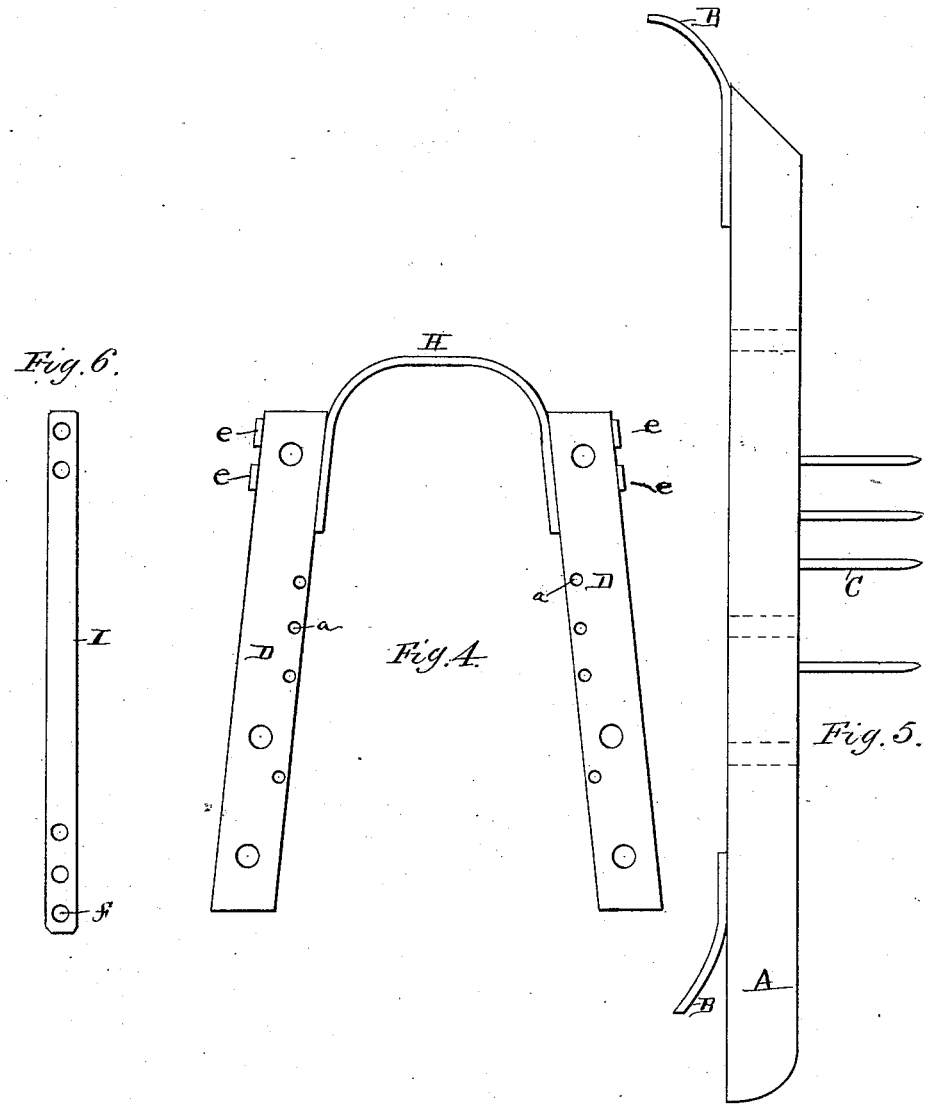

DWIGHT BRINTNALL AND WILLIAM HARRISON, OF DYSART, IOWA.

ANIMAL-POKE.

SPECIFICATION forming part of Letters Patent No. 257,147, dated May 2, 1882.

Application filed September 15, 1881. (No model.)

*To all whom it may concern:*

Be it known that we, DWIGHT BRINTNALL and WM. HARRISON, of Dysart, Tama county, Iowa, have invented an Improvement in Animal-Pokes, of which the following is a specification.

Our invention relates to an improvement in animal-pokes; and it consists in certain details in construction and combinations of parts, as will be more fully explained, and pointed out in the claims.

In the accompanying drawings, Figure 1 is a view in perspective of our improved poke. Fig. 2 is a detached perspective view of the curved bearing or collar plate. Fig. 3 is a detached perspective view of one of the inside slats. Fig. 4 is a front view of the inside slats and bearing-plate. Fig. 5 is a detached view of the outer slats with its attached parts; and Fig. 6 is a detached view of the adjustable cross-bar.

A represents the outside long slats or bars, made of wood, of suitable size, and provided at their upper and near their lower ends with the curved metallic hooks B, which latter are adapted to engage with the fence and prevent the animal from jumping over or getting between the bars thereof. These outside slats, A, are also provided with pointed metallic spurs C, extending rearwardly and entering suitable apertures, $a$, formed at suitable distances apart in the inside short slats, D. These inside short slats, D, are provided near both ends with guide-rods E, extending at right angles thereto, and adapted to freely pass through and move in suitable perforations formed in the outer slats, A, where they are secured and prevented from complete withdrawal by the lock-nuts $c$.

F are spiral springs encircling said guide-rods E between the slats A and D, and adapted to separate them sufficiently to thoroughly protect the points of the spurs when all pressure on the said slats is relieved. When pressure is brought to bear on the outside slats, A, they are caused to move inwardly on the rods E, and carry with them the pointed spurs C, which pass through the apertures and prick the animal. As soon as the pressure on the slats A is relieved the springs F move the said slats A outwardly until the pointed ends of the spurs C are again inside of the apertures.

H is a suitably-curved bearing plate or collar, adapted to form the support for the poke. This plate is curved substantially as shown in the drawings, and is provided with the holes $d$, near one end thereof, through which the bolts $e$ pass to secure it to the inside slats, D. This collar or bearing plate H, together with the upper guide-rods E securely hold the upper ends of the slats A and D in position, while the lower ends thereof are separated and retained in their proper relative positions by the cross-bar I and the lower rods E, on which the said cross bar I is secured. This cross-bar is provided with a series of holes, $f$, on opposite ends thereof, by means of which the slats A and D on opposite sides are adjusted at their lower ends to suit animals of different sizes.

When our improved poke has been secured on an animal, and a direct pressure applied to the slats A, or to the slats A through the medium of the hooks B, the springs F are caused to yield, which allows the slats A to approach the slats D and move the spurs C inward until the pointed ends thereof emerge from the apertures $a$ and embed themselves in the animal. When the pressure on the slats A is relieved the springs F force the slats A outward, which withdraws the spurs within the apertures, where they remain until again forced outward by sufficient pressure applied to the outer slats, A.

Our improvement is simple in construction, of light weight, is durable and efficient in use, and can be manufactured at a comparatively small first cost.

Having fully described our improvement, what we claim as new, and desire to secure by Letters Patent, is—

1. In an animal-poke, the combination, with the inner slats provided with guide-rods and apertures for the passage of spurs, and the outer slats provided with spurs and apertures for the passage of the guide-rods, of springs encircling said guide-rods, a curved collar removably secured to the upper ends of the inner slats, and hooks secured to the upper and lower ends of the outer slats, substantially as set forth.

2. In an animal-poke, the combination, with the inner and outer slats provided with apertures, guide-rods, and spurs, as described, and a collar or bearing plate secured to the inside slats and adapted to form the support for the poke, of a cross-bar provided with a series of holes by means of which the width of the poke is increased or diminished, substantially as set forth.

3. In an animal-poke, the combination, with the inner and outer slats provided with apertures, guide-rods, spurs, and hooks, as described, of a collar or bearing plate secured to the inside slats and adapted to form a support for the poke, and a cross-bar provided with a series of holes through which the guide-rods pass for the purpose of increasing or diminishing the width of the poke at its lower end, substantially as set forth.

DWIGHT BRINTNALL.
WILLIAM HARRISON.

Witnesses:
N. C. RICE,
D. L. BACHTELL.